United States Patent
Chatterjee (12)
(10) Patent No.: US 6,424,707 B1
(45) Date of Patent: Jul. 23, 2002

(54) POINT-TO-POINT-TO-POINT CALLING

(75) Inventor: Ranjan Chatterjee, Bethlehem, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/062,764

(22) Filed: Apr. 20, 1998

(51) Int. Cl.[7] .......................... H04M 1/00; H04M 3/56; H04M 3/58; H04M 1/27; H04Q 7/06

(52) U.S. Cl. .................. 379/212.01; 379/157; 379/158; 379/202.01; 379/209.01; 379/355.01; 379/900; 455/426

(58) Field of Search .......................... 379/199, 201, 379/200, 202, 209, 210, 265, 216, 355, 356, 157, 158, 201.01, 201.02, 202.01, 207.02, 207.03, 207.11, 209.01, 211.01, 212.01, 216.01, 265.01, 265.02, 355.01, 355.02, 355.03, 356.01, 900; 455/426

(56) References Cited

U.S. PATENT DOCUMENTS

| | | | | |
|---|---|---|---|---|
| 3,704,346 A | * | 11/1972 | Smith et al. | 379/211 |
| 3,959,600 A | * | 5/1976 | Sousa | 379/210 |
| 4,086,438 A | * | 4/1978 | Kahn et al. | 379/210 |
| 4,117,270 A | * | 9/1978 | Lesea | 379/210 |
| 4,893,335 A | * | 1/1990 | Fuller et al. | 379/200 |
| 4,942,598 A | * | 7/1990 | Davis | 379/211 |
| 5,075,894 A | * | 12/1991 | Iwase et al. | 379/211 |
| 5,077,789 A | * | 12/1991 | Clark et al. | 379/201 |
| 5,222,123 A | * | 6/1993 | Brown et al. | 379/57 |
| 5,249,221 A | * | 9/1993 | Ketring | 379/211 |
| 5,309,511 A | * | 5/1994 | Kotake | 379/211 |
| 5,327,486 A | * | 7/1994 | Wolff et al. | 379/211 |
| 5,448,627 A | * | 9/1995 | Ueno et al. | 379/211 |
| 5,502,762 A | * | 3/1996 | Andrew et al. | 379/202 |
| 5,617,471 A | * | 4/1997 | Rogers et al. | 379/212 |
| 5,719,925 A | * | 2/1998 | Peoples | 379/201 |
| 5,737,403 A | * | 4/1998 | Zave | 379/211 |
| 5,884,159 A | * | 3/1999 | Thro et al. | 455/412 |
| 5,940,488 A | * | 8/1999 | Degrazia et al. | 379/212 |
| 5,966,653 A | * | 10/1999 | Joensuu et al. | 379/211 |
| 5,987,113 A | * | 11/1999 | James | 379/209 |
| 6,011,843 A | * | 1/2000 | Hochman et al. | 379/211 |
| 6,073,031 A | * | 6/2000 | Helstab et al. | 455/557 |
| 6,148,193 A | * | 11/2000 | Miska et al. | 455/410 |

* cited by examiner

Primary Examiner—Harry S. Hong
(74) Attorney, Agent, or Firm—Manelli, Denison & Setler, PLLC (57) ABSTRACT

A method and apparatus for establishing a point-to-point-to-point telephone connection between a remote telephone and a desired called telephone. The method and apparatus use a two-line base telephone unit, e.g., a home or office telephone, as an intermediary point in the telephone call to reduce long distance rates and/or to utilize features and/or information stored in the base telephone unit when the user is away from the home or office. In a first embodiment, the remote telephone makes a local call to the base telephone unit and instructs the base telephone unit to establish a telephone call with, and interconnect the remote telephone to, a called third party. In a second embodiment, the remote telephone makes a quick call to the base telephone unit instructing the base telephone unit to establish and interconnect both a telephone call back to the remote telephone and a second telephone call to the desired called telephone. In a third embodiment, the instructions from the remote telephone to the base telephone unit are transmitted through an external communication link such as a paging system or the Internet.

12 Claims, 6 Drawing Sheets

POINT-TO-POINT-TO-POINT CALLING

BACKGROUND OF THE INVENTION

1. Field of the Invention

This invention relates generally to telephonic communication systems. More particularly, it relates to a method and apparatus to allow a user to initiate the establishment of a call, e.g., a long distance call, from a remote site, through an intermediately called base telephone unit.

2. Background of Related Art

Telephone systems are known. When a user at the home or office wishes to call someone, they may utilize a conventional telephone apparatus located at a home or office (i.e., a base telephone). When away from the home or office, they may utilize a remote telephone such as a pay telephone or a hotel telephone.

As is also known, it is generally common practice for telephone companies to offer low priced telephone service for calls made from the user's home or office telephone, i.e., where the user has a telephone contract for the provision of telephone service. However, when the user is away from the home or office, it is also general practice for the telephone companies to charge higher or additional fees for a call placed to the same party but from a public or otherwise remote telephone other than their home or office telephone.

Figure 7:
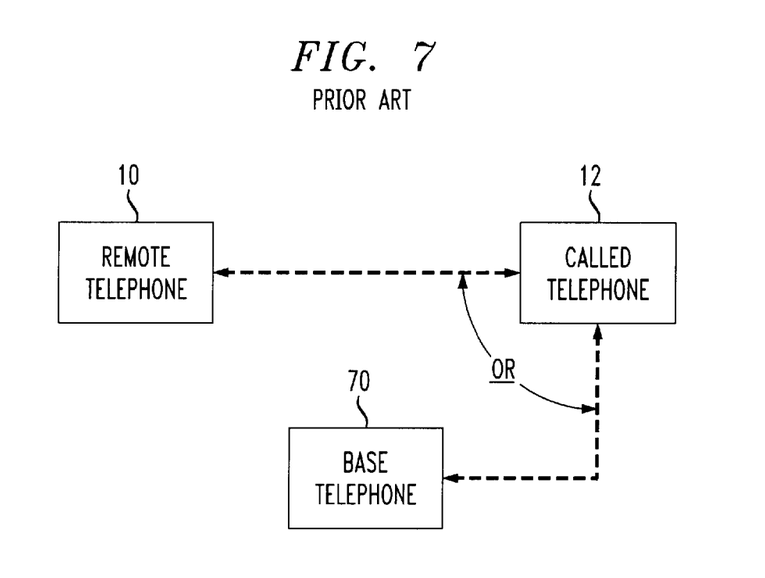
FIG. 7 shows conventional techniques for placing a telephone call to a called telephone, e.g., either from a home or office base telephone, or from a remote telephone away from the home or office.

FIG. 7 shows two conventional techniques for making a call to a called telephone 12. In particular, when the user is at their home or office, they may place a call to the called telephone 12 directly from a base telephone 70 located in their home or office. This is depicted in FIG. 7 with a dotted line between the base telephone 70 and the called telephone 12. Alternatively, when the user is away from their home or office, they may place a call to the called telephone 12 directly from a remote telephone 10, e.g., a pay phone, hotel telephone, etc.

When a call is placed to the called telephone 12 from the base telephone 70 (e.g., the user's home or office telephone), telephone charges (e.g., long distance charges) are likely to be at their lowest. However, when the same call to the called telephone 12 is placed from a remote telephone 10, telephone charges such as long distance charges may be higher as compared with the same call being made from the user's home or office. Thus, calls made from a remote telephone 10 typically cost more than calls made from the user's base telephone 70 at their home or office.

Moreover, when the user is placing a call from a remote telephone 10, they may not have access to features or information stored in their base telephone 70 at their home or office. For instance, speed dial numbers may be preprogrammed into the base telephone 70 such that the user may not recall the telephone numbers to dial when at the remote telephone 10. Thus, the user must return to the home or office to interrogate the base telephone 70 to determine the information stored therein. This is wasteful of time and effort.

There is a need for eliminating unnecessary charges to a user when placing a call to a called telephone 12 from a remote telephone 10. There is also a need to allow utilization of information and/or features stored in a base telephone, e.g., when away from the home or office.

SUMMARY OF THE INVENTION

In accordance with the principles of a first aspect of the present invention, a point-to-point-to-point telephone connection is established with a two-line telephone unit. A point-to-point-to-point telephone call request is received on a first telephone line from a remote telephone. In response to the point-to-point-to-point request, a telephone connection is established with a desired called telephone on a second telephone line. A communication path is established between the first telephone line and the second telephone line, thus forming the point-to-point-to-point telephone connection between the remote telephone and the called telephone with the two-line telephone unit as an intermediary.

In another aspect of the present invention, a telephone connection is established with a remote telephone. A point-to-point-to-point telephone call request is received from the remote telephone. The telephone connection with the remote telephone is terminated, and reestablished on a first telephone line. A telephone connection is established with a desired called telephone on a second telephone line, and the first telephone line is connected with the second telephone line to establish the point-to-point-to-point telephone connection between the remote telephone and the called telephone.

In yet another aspect of the present invention, a point-to-point-to-point telephone call request is received from a remote telephone. A first telephone connection is established with the remote telephone on a first telephone line. A second telephone connection is established with a desired called telephone on a second telephone line. A communication path is established between the first telephone line and the second telephone line, forming the point-to-point-to-point telephone connection between the remote telephone and the called telephone with the two-line telephone unit as an intermediary.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a method and apparatus for placing a telephone call to a called party through an intermediary base telephone, e.g., the caller's home or office telephone. This establishes a point-to-point-to-point telephone call, e.g., to utilize features and/or information stored in the home or office telephone, and/or to eliminate the need for additional fees commonly associated with a call made directly from the remote telephone.

Three main embodiments will be described for establishing a call between a remote telephone and a called telephone with the caller's base telephone as an intermediary: (1) when the base telephone is within a local calling area of the remote telephone; (2) when the base telephone is outside a local calling area of the remote telephone; and (3) by using an external communication link (e.g., the Internet, pager or other wireless communication link) between the remote telephone and the base telephone.

(1) Base Telephone Local To the Remote Telephone

Figure 1:
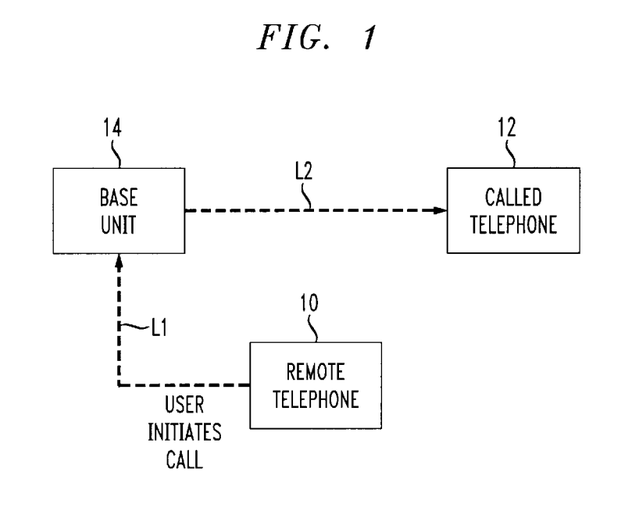
FIG. 1 shows a first embodiment of the present invention wherein a remote telephone establishes a telephone connection with a base telephone unit, which is instructed by the remote telephone to establish a second call to a desired called party.

FIG. 1 depicts, in simplified form, a first embodiment of the present invention wherein a caller from a remote telephone 10 initiates a long distance call to a called telephone 12 by first initiating a call to their home or office telephone, i.e., a base telephone unit 14. The base telephone unit 14 acts as an intermediary in establishing the long distance call to the called telephone 12, presumably at reduced rates.

Thus, in one aspect of the present invention, higher fees may be avoided by allowing the user to connect through a base telephone unit 14 at their home or office. According to the principles of the present invention, the base telephone unit 14 establishes a call between two parties (i.e., a calling party and a requested third party), upon activation by a remote telephone 10. Activation by the remote telephone 10 may be by a telephone call from the remote telephone 10 to the base telephone unit 14 as in the present embodiment, or may be by other communication means, e.g., over the Internet or through a wireless communication link such as a pager system.

When the base telephone unit 14 is within the local calling area of the remote telephone 10, the only significant telephone company charges will be those charged to the home or office telephone (i.e., the base telephone unit 14 for the long distance link to the called telephone 12), which presumably are lower than those that would be assessed if the remote telephone 10 were to establish a direct long distance connection to the called telephone 12. Since the only long distance connection in this scenario is between the home telephone or base telephone unit 14 and the long distance called telephone 12 and not from the remote telephone 10 to the base telephone unit 14, the caller can potentially avoid higher long distance rates such as those that are typically charged with, e.g., pay telephones, hotel telephones, calling cards, etc.

Moreover, by having the base telephone unit 14 establish a connection with the called telephone 12, the features and information stored in the base telephone unit 14 may be utilized accordingly. Thus, for instance, if the base telephone unit 14 includes a pre-programmed speed dial, the base telephone unit 14 need only receive a control signal (e.g., a DTMF tone) representing the number of the speed dial or the name of the person to be dialed. The base telephone unit 14 may include software routines to provide the user with an audible selection of features and/or information for selection with respect to the call to be made by the base telephone unit 14 to the called telephone 12.

Figure 2:
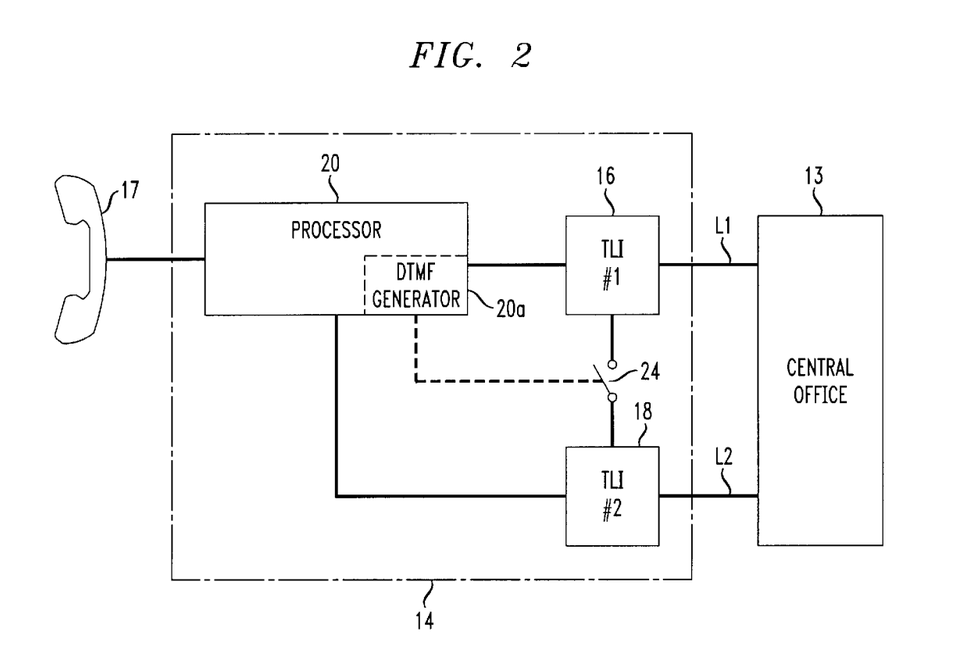
FIG. 2 shows the relevant portions of a base telephone unit in accordance with the principles of the present invention.

FIG. 2 shows the relevant portions of the base telephone unit 14 in greater detail.

One embodiment of a base telephone unit 14 in accordance with the present invention includes otherwise conventional circuitry for a two-line telephone for connection with a central office 13 via first and second telephone lines L1 and L2. Of course, the invention is equally applicable to a base telephone unit 14 having only one telephone line to the central office 13 if conferencing capability is provided elsewhere in the public switched telephone network (PSTN), e.g., by the central office 13.

The base telephone unit 14 includes conventional telephone line interfaces (TLIs) 16 and 18. The TLIs 16, 18 each include a ring detector to detect an incoming call, and appropriate circuitry to provide the proper DC impedance and AC modulation to the respective telephone line L1, L2. The base telephone unit 14 may establish a telephone call (e.g., from the remote telephone 10 or to the called telephone 12) on either the first or second TLI 16, 18.

The base telephone unit 14 further includes a processor 20, which may be any suitable microprocessor, microcontroller or digital signal processor (DSP). The processor 20 includes a conventional dual tone multiple frequency (DTMF) decoder for detecting control signals from a remote telephone 10. The DTMF decoder decodes incoming DTMF command signals, e.g., from the remote telephone 10, for storage and/or analysis by the processor 20.

The control signals from the remote telephone 10 may include a telephone number to be called by the base telephone unit 14 and interconnected with the remote telephone 10. The control signals may alternatively or additionally include instructions for performing a specific feature of the base telephone unit 14, e.g., to call a specific pre-programmed speed dial number on the other of the two telephone lines L1, L2.

The processor 20 further includes a DTMF generator 20a to automatically dial the telephone number of the called telephone 12 on the available one of the telephone lines L1, L2, i.e., the telephone line which is not being utilized to receive the control signals from the remote telephone 10.

The base telephone unit 14 further includes a switch 24 to interconnect a call between the first TLI 16 connected to the first telephone line L1 and the second TLI 18 connected to the second telephone line L2. The switch 24 includes circuitry similar to that found in conventional conference calling or three way telephone systems. The switch 24 is closed under the control of the processor 20 to establish a connection between a party on the first telephone line L1 (e.g., the remote telephone 10 in FIG. 1) and party on the second telephone line L2 (e.g., the called telephone 12 in FIG. 1). Connection of the first and second TLIs 16, 18 through the switch 24 establishes a point-to-point-to-point connection between, e.g., the remote telephone 10 and the called telephone 12.

The base telephone unit 14 may further include a conventional telephone handset 17 if desired to allow telephone calls in a conventional manner from the base telephone unit 14. However, the inclusion of a handset 17 at the base telephone unit 14. is not necessary to the principles of the present invention.

If included in the base telephone unit 14, the handset 17 of the base telephone unit 14 may or may not be switched out or muted upon connection of the first telephone line L1 with the second telephone line L2 through the switch 24, depending on the specific application. Switching or muting the handset 17 will allow for a private connection between the remote telephone 10 and the called telephone 12, and can be performed at all times, or as instructed by control signals from the remote telephone 10.

Figure 3:
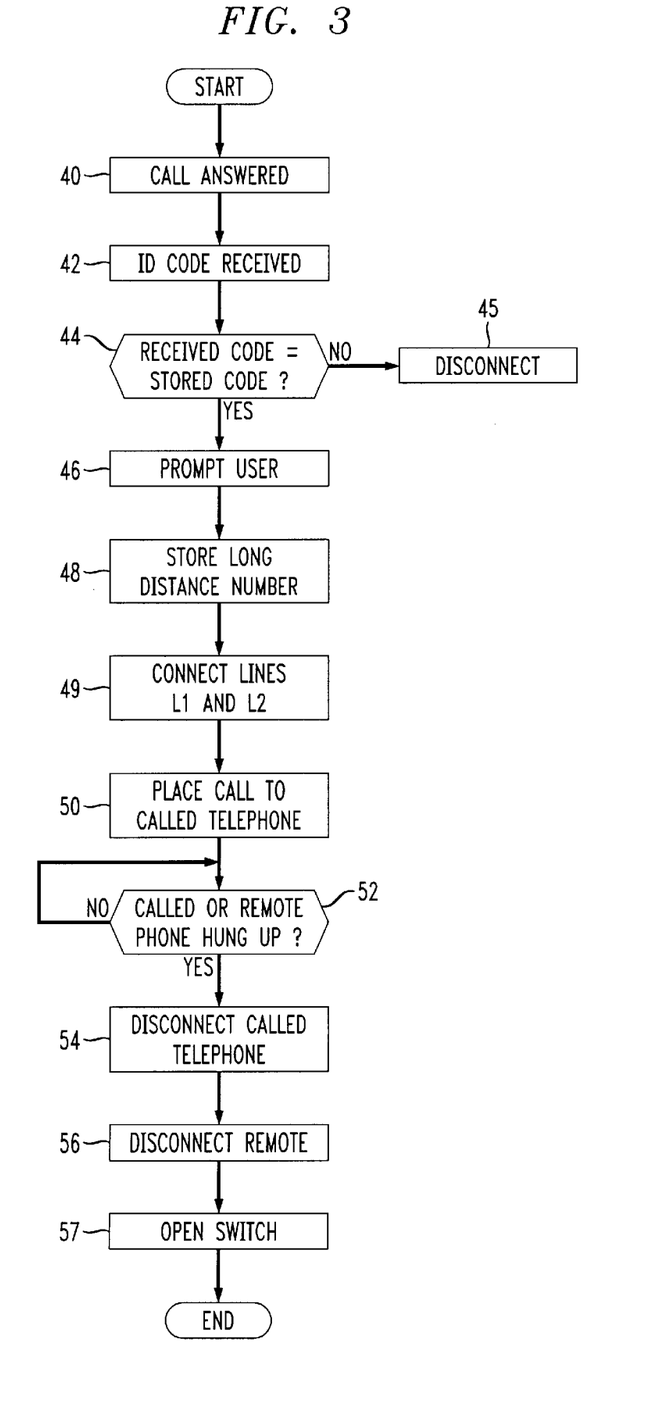
FIG. 3 shows a flowchart of the inventive method in accordance with a first embodiment of the present invention.

FIG. 3 is a flow chart showing one method of establishing a point-to-point-to-point connection between a remote telephone 10, a base telephone unit 14, and a called telephone 12, in accordance with the principles of the first embodiment.

In particular, a call from the user at a remote telephone 10 is answered by the base telephone unit 14 in step 40. Alternatively, the call from the remote telephone 10 may be passed to a facsimile machine, or other telephonic equipment interconnected with the base telephone unit 14.

After the call is answered by the base telephone unit 14, the remote user may control the base telephone unit 14 in any of a number of ways, e.g., by pressing keys at the remote telephone 10 causing DTMF tones to be transmitted on the telephone line, by voice recognition routines at the base telephone unit 14, or by automatic recognition of call related information received at the base telephone unit 14.

The user may or may not be prompted by the base telephone unit 14, according to the specific application. For instance, the base telephone unit 14 may answer the call as if to record a voice message in a conventional fashion, but be passed to a point-to-point-to-point calling routine in the processor 20 upon entry of a predetermined code input by the remote user while the outgoing greeting message plays. FIG. 3 shows the process of an embodiment wherein the user is prompted for input.

In particular, FIG. 3 shows an embodiment wherein an audible prompt from the base telephone unit 14 is provided to the remote telephone 10 in step 42 requesting the input of control information, e.g., an identification (ID) code such as a personal identification number (PIN). The ID code may be input at the remote telephone by depressing keys on the telephone keypad, causing DTMF tones to be transmitted to the base telephone unit 14, which utilizes the DTMF decoder to decode the same.

The ID code is compared by the processor 20 in the base telephone unit 14 against pre-authorized ID codes pre-stored in memory in step 44.

If the ID code does not match a pre-authorized ID code pre-stored in the memory, then the call from the remote telephone 10 is terminated in step 45. If the ID code matches an authorized ID code, then activation of a point-to-point-to-point call is allowed to proceed.

In step 46, the user at the remote telephone 10 is prompted for instructions, e.g., to input a telephone number to be dialed from the base telephone unit 14, to input a speed dial telephone number to be dialed, etc. The processor 20 may store the instructions and/or telephone number as required by the specific application, as depicted in step 48.

The switch 24 is closed, or the first and second TLIs 16, 18 are otherwise interconnected in step 49. Although step 49 as shown in FIG. 3 interconnects the remote telephone 10 with the call to the called telephone 12 before the base telephone unit 14 establishes a call to the called telephone 12, the present invention is equally applicable to connection of the first and second TLIs 16, 18 (i.e., the remote telephone 10 with the called telephone 12) after the base telephone unit 14 establishes the requested telephone call to the called telephone 12.

The base telephone unit 14 dials the telephone number of the called telephone 12 or otherwise performs a function to establish a telephone call with the called telephone 12 on the available one of the two telephone lines L1, L2, as shown in step 50. Accordingly, a point-to-point-to-point call between the remote telephone 10 and the called telephone 12 is established when the called telephone 12 is answered.

Step 52 monitors the first and second telephone lines L1, L2 to determine when either telephone is hung up. When either the remote telephone 10 or the called telephone 12 is hung up, the base telephone unit 14 disconnects the called telephone 12 (step 54) and the remote telephone 10 (step 56), and opens the switch 24 or otherwise disconnects the connection between the first and second telephone lines L1 and L2.

(2) Base Telephone Long Distance To the Remote Telephone

Figure 4:
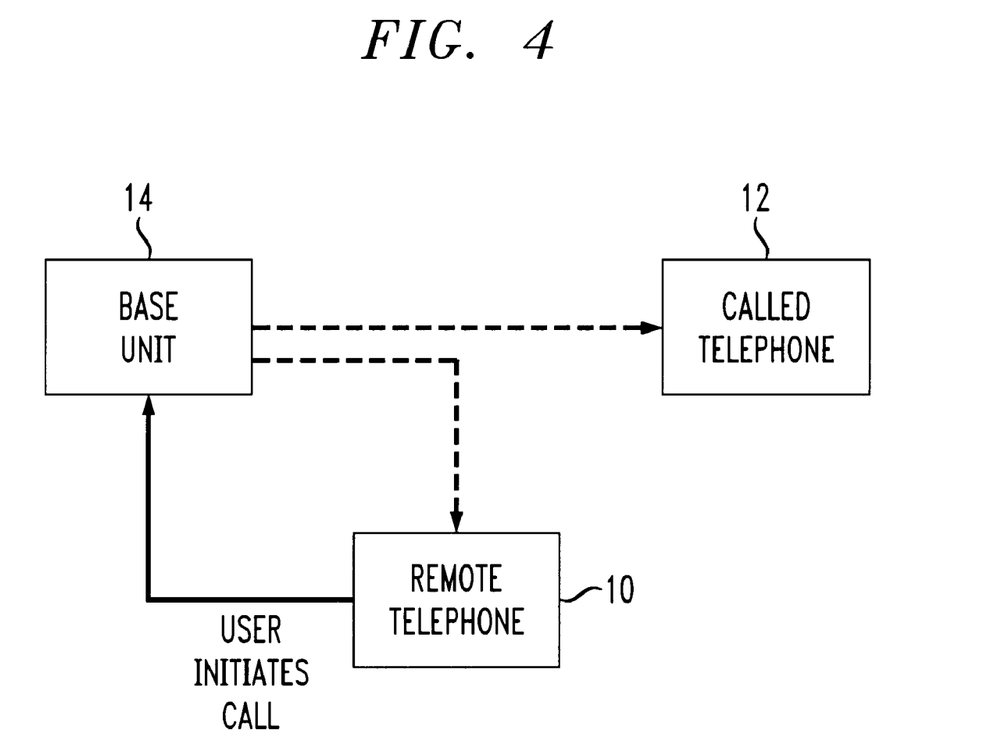
FIG. 4 shows a second embodiment of the present invention wherein a remote telephone instructs a base telephone unit to call the remote telephone back and to establish a telephone call to a called telephone.

FIG. 4 shows a second embodiment of the present invention wherein a remote telephone 10 may not be within a local calling zone of the base telephone unit 14. In this case, it may be desirable for the base telephone unit 14 to establish a telephone call to both the called telephone 12 and back to the initiating remote telephone 10.

In particular, FIG. 4 illustrates a point-to-point-to-point telephone call established by the base telephone unit 14. Initially, the remote telephone 10 calls the base telephone unit 14, instructs the base telephone unit 14 as to the desired function to be performed (e.g., to dial a pre-programmed speed dial telephone number, or a telephone number manually input at the remote telephone 10). The instructions may also include the telephone number of the remote telephone 10, or the telephone number may be obtained from the telephone company, e.g., using a caller information delivery service such as Caller ID. In this case, the base telephone unit 14 will include a conventional Caller ID receiver, which will provide the telephone number of the remote telephone 10 to the processor 20.

After the remote telephone 10 instructs the base telephone unit 14, the connection between the remote telephone 10 and the base telephone unit 14 is terminated, i.e., the remote telephone 10 is hung-up to allow the base telephone unit 14 to make two telephone calls, a first to the remote telephone 10 and a second to the called telephone 12.

After a brief delay, the base telephone unit 14 will then call the user at the telephone number of the remote telephone 10. If the user answers, the base telephone unit 14 will then call the telephone number of the called telephone 12. Accordingly, both legs of the point-to-point-to-point connection between the remote telephone 10 and the called telephone 12 are sourced by the base telephone unit 14, possibly providing lowered toll charges but also allowing the remote telephone 10 to utilize features and/or information stored in the base telephone unit 14.

It is preferred that the remote telephone 10 be called by the base telephone unit 14 before the called telephone 12 so that the user at the remote telephone 10 can greet the person answering the called telephone 12 as soon as they pick up the automatic call from the base telephone unit 14.

Figure 5A:
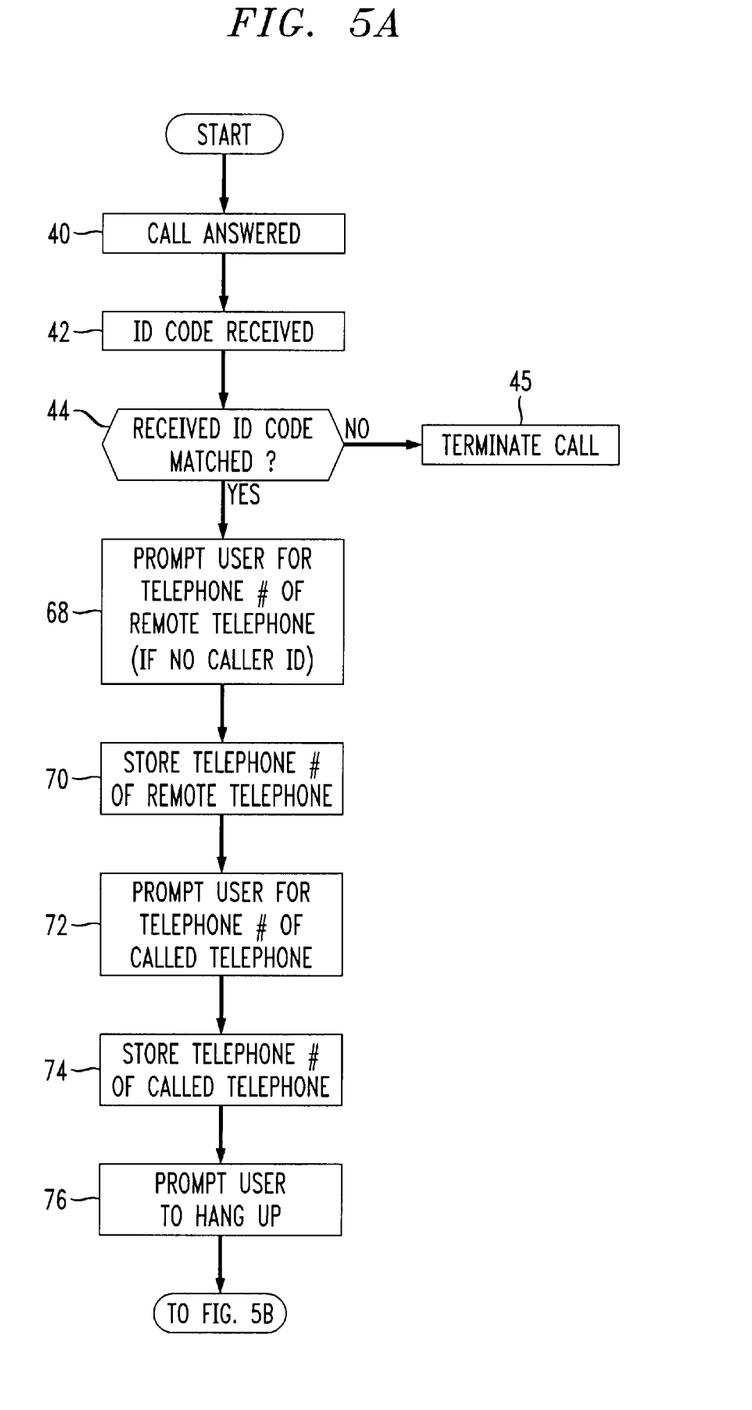
FIGS. 5A and 5B show flowcharts of the inventive method in accordance with the principles of the second embodiment of the present invention.

The operation of the second embodiment is shown in greater detail in FIG. 5A. Steps 40 to 45 in FIG. 5A are as described with respect to the same steps in FIG. 3.

After the ID code is authorized by step 44, the user at the remote telephone 10 is prompted to input (e.g., by DTMF tones) the telephone number of the remote telephone 68. Of course, if the base telephone unit 14 is equipped with a Caller ID receiver, the telephone number of the remote telephone 10 may be obtained by the processor 20 from the Caller ID receiver without prompting the user for input in step 68.

The telephone number of the remote telephone 10 is stored by the processor 20 in step 70, and the user is prompted for instructions, e.g., for a speed dial number or a telephone number of the called telephone 12 in step 72. The telephone number of the called telephone 12 is stored in step 74.

The user at the remote telephone 10 is then instructed to hang-up. Alternatively, the base telephone unit 14 may simply detect a hang-up by the remote telephone 10, or even simply terminate the call itself via the TLI 16 or 18 through which the remote telephone 10 is calling.

Figure 5B:
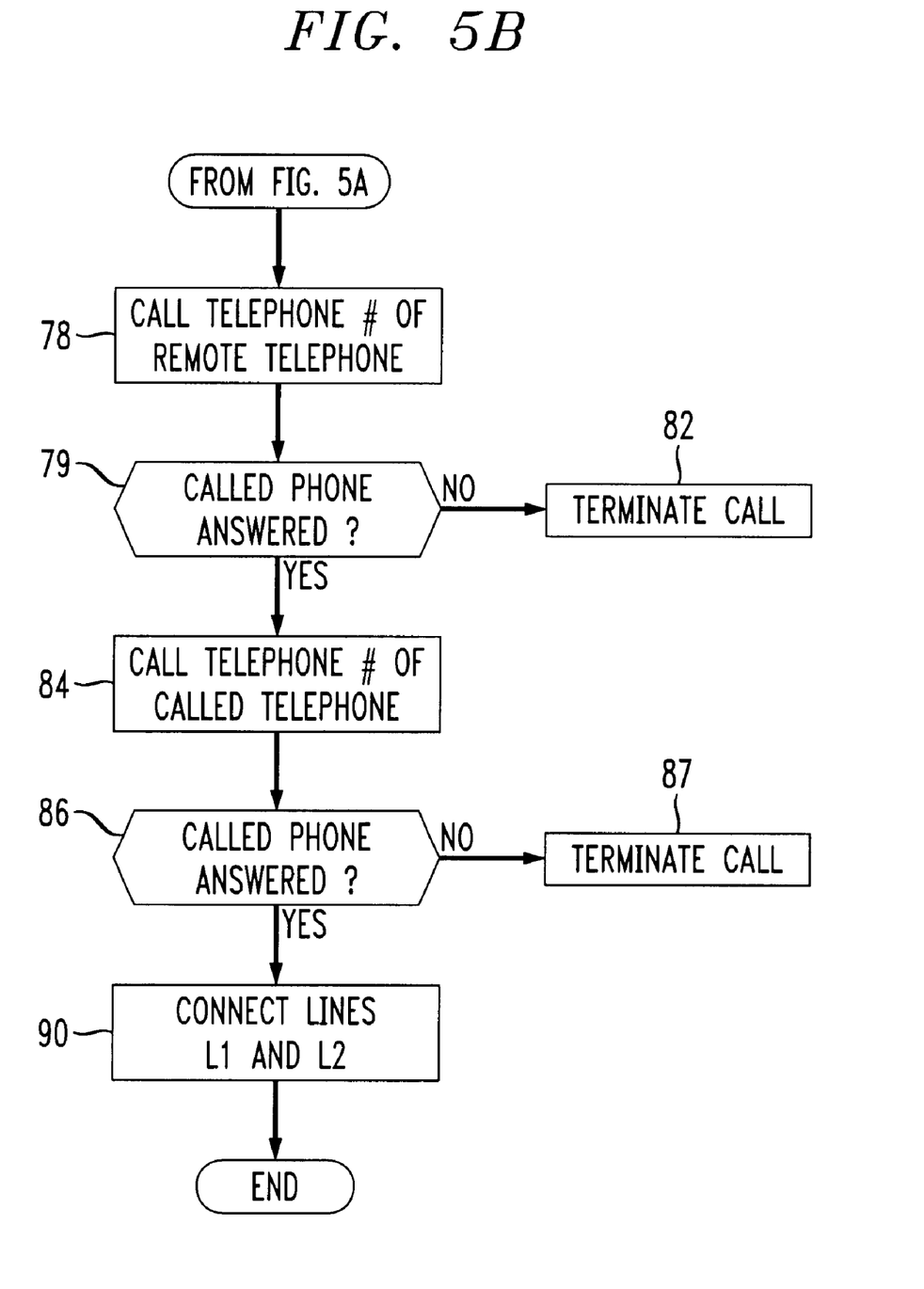

FIG. 5B shows the automatic call-back operation of the base telephone unit 14 after the process shown in FIG. 5A.

In particular, the base telephone unit 14 calls the remote telephone 10 back in step 78, and waits for the remote telephone 10 to answer in step 79. If the remote telephone 10 fails to answer the call back from the base telephone unit 14, e.g., within a predetermined number of rings, the call (and the remainder of the process shown in FIG. 5B) is terminated in step 82.

When the remote telephone 10 answers the call back from the base telephone unit 14, the base telephone unit 14 then calls the called telephone 12 on the other available telephone line L1 or L2, as shown in step 86. If the call is not answered, e.g., within a predetermined number of rings, the call (and remainder of the process) is terminated in step 87.

The two telephone lines L1 and L2 are interconnected using switch 24 (FIG. 2) or other connection means as shown in step 90. Of course, the two telephone lines L1 and L2 may be interconnected at any time in the call-back procedure shown in FIG. 5B.

(3) Using External Communication Link

Figure 6:
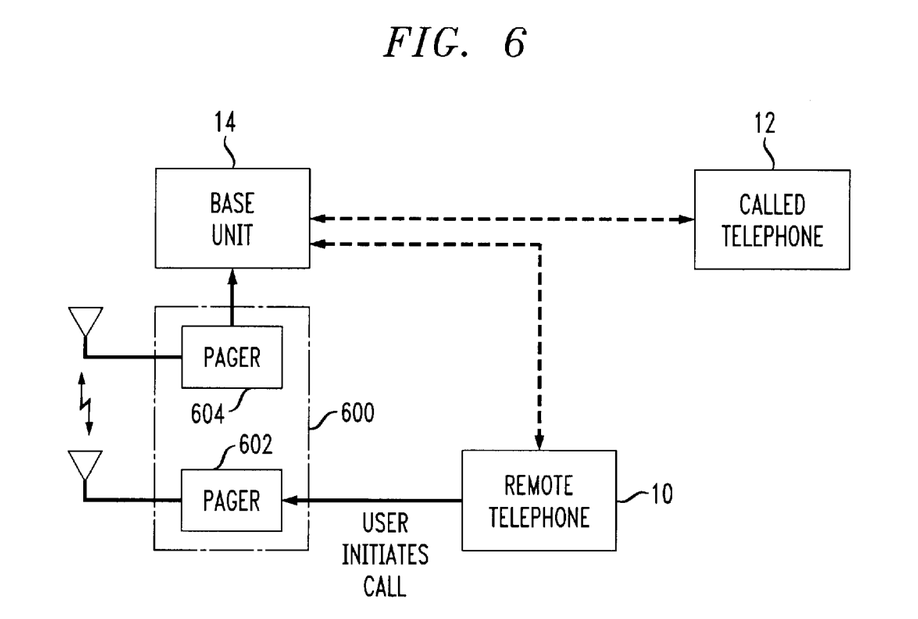
FIG. 6 shows a third embodiment of the present invention wherein a remote telephone instructs a base telephone unit to establish a point-to-point-to-point telephone connection using an external communication path such as a paging system.

The user at the remote telephone 10 may use means other than directly through the telephone (e.g., the Internet, a paging system, etc.) to initiate a point-to-point-to-point call through the base telephone unit 14. FIG. 6 shows a third embodiment in accordance with the principles of the present invention, wherein a pager message, e.g., a two-way pager message, instructs the base telephone unit 14 to establish a point-to-point-to-point telephone call between a remote telephone 10 and a called telephone 12.

In particular, this embodiment is essentially as described with respect to the second embodiment shown in FIGS. 4, 5A and 5B except that the remote telephone 10 may instruct the base telephone unit 14 by way of an external communication system, e.g., using a two-way paging system 600.

The external communication system, e.g., the two-way paging system 600 is used, e.g., to provide the base telephone unit 14 with the telephone number of the remote telephone 10 and the telephone number or other instructions relating to the called telephone 12 (e.g., a speed dial number). The remote telephone 10 interfaces to a first pager 602, and the base telephone unit 14 interfaces to a second pager 604 such that a packetized data message can be sent from the remote telephone 10 to the base telephone unit 14.

Alternatively, instead of using the paging system 600, the remote telephone 10 may establish a local connection to an Internet Service Provider (ISP), as would the base telephone unit 14. Then, the remote telephone 10 would pass a data packet containing instructions on establishing a point-to-point-to-point telephone connection between the remote telephone 10, the base unit 14, and the called telephone 12.

All embodiments of the present invention can be utilized in a point-to-point long distance environment with a one-line base telephone unit. In this case, the remote telephone 10 may simply call a one-line base telephone unit and instruct the same to automatically call the remote telephone 10 back after the remote telephone 10 hangs up. The user at the remote telephone 10 may manually input the telephone number of the remote telephone 10, or the base telephone unit 14 may include a caller information receiver such as a Caller ID receiver to automatically determine the telephone number of the caller (i.e., the remote telephone 10). The instruction to the base telephone unit 14 may be passed over the telephone after the base telephone unit 14 answers the call from the remote telephone 10, or over an external communication path such as a paging system or the Internet.

The remote telephone 10 may also trigger the base unit 14 to callback the remote telephone upon receipt of a predetermined sequence of calls. This is particularly applicable if the base telephone unit 14 includes a caller information receiver such as a Caller ID receiver. In this case, for instance, the remote telephone 10 may call the base telephone unit 14 two times within, e.g., 1 minute, allowing the telephone to ring only, e.g., once each time. The base telephone unit 14, being programmed to answer an incoming call after a larger number of rings, does not answer the calls from the remote telephone 10, but instead identifies the two calls from the remote telephone 10 via the Caller ID information, and automatically calls the remote telephone 10 back. Further instructions from the remote telephone 10 can proceed after the base telephone unit 14 calls the remote telephone 10 back.

While the invention has been described with reference to the exemplary embodiments thereof, those skilled in the art will be able to make various modifications to the described embodiments of the invention without departing from the true spirit and scope of the invention.

What is claimed is:

1. A method of establishing a point-to-point-to-point telephone connection with a caller's two-line telephone base unit, said method comprising:

receiving in said base unit a point-to-point-to-point telephone call request over at least one of a paging system and an Internet;

in response to said point-to-point-to-point request from said caller, establishing in said base unit a telephone connection with a desired called telephone on a second telephone line of said base unit; and establishing in said base unit a communication path between a first telephone line and said second telephone line to establish said point-to-point-to-point telephone connection between a remote telephone and said called telephone with said two-line base telephone unit as an intermediary.

2. The method of establishing said point-to-point-to-point telephone connection according to claim 1, further comprising:

receiving in said base unit a personal identification number from said remote telephone; and comparing in said base unit said received personal identification number to a pre-stored personal identification number, and performing said step of interconnecting if a match is determined between said received personal identification number and said pre-stored personal identification number.

3. The method of establishing said point-to-point-to-point telephone connection according to claim 1, further comprising:

in response to said request, establishing in said base unit a callback telephone connection with said remote telephone.

4. A method of establishing a point-to-point-to-point telephone connection through a caller's base telephone, comprising:

establishing in said base telephone a telephone connection with said caller's base telephone from a remote telephone having a different telephone number from that of said base telephone;

receiving in said base telephone a point-to-point-to-point telephone call request from said caller on said remote telephone;

terminating said telephone connection with said remote telephone;

re-establishing in said base telephone on a first telephone line of said base telephone a connection with said remote telephone;

establishing in said base telephone a telephone connection with a desired called telephone on a second telephone line of said base telephone; and interconnecting in said base telephone said first telephone line with said second telephone line to establish said point-to-point-to-point telephone connection between said remote telephone and said called telephone.

5. The method of establishing said point-to-point-to-point telephone connection according to claim 4, further comprising:

receiving in said base telephone a personal identification number from said remote telephone; and comparing in said base telephone said received personal identification number to a pre-stored personal identification number, and performing said step of interconnecting if a match is determined between said received personal identification number and said pre-stored personal identification number.

6. A method of establishing a point-to-point-to-point telephone connection with a caller's two-line telephone base unit, said method comprising:

receiving in said base unit a point-to-point-to-point telephone call request over at least one of a paging system and an Internet;

establishing in said base unit a first telephone connection with said remote telephone on a first telephone line of said base unit;

establishing in said base unit a second telephone connection with a desired called telephone on a second telephone line of said base unit; and establishing in said base unit a communication path between said first telephone line and said second telephone line to establish said point-to-point-to-point telephone connection between said remote telephone and said called telephone with said two-line telephone base unit as an intermediary.

7. Apparatus for establishing a point-to-point-to-point telephone connection with a caller's two-line telephone base unit, comprising:

a first telephone line interface of said base unit;

a module in said base unit to receive a point-to-point-to-point telephone call request over at least one of a paging system and an Internet;

a second telephone line interface of said base unit;

an automatic dialer in said base unit adapted to automatically establish a telephone connection with a called telephone through said second telephone line interface, said called telephone being based on information contained in said call request; and a switchable communication path between said first telephone line interface and said second telephone line interface.

8. The apparatus for establishing said point-to-point-to-point telephone connection according to claim 7, further comprising:

a module in said base unit adapted to receive a personal identification number from said remote telephone; and a processor in said base unit adapted to compare said received personal identification number to a pre-stored personal identification number, said switchable communication path being established only if a match is determined between said received personal identification number and said pre-stored personal identification number.

9. The apparatus for establishing said point-to-point-to-point telephone connection according to claim 7, wherein:

said automatic dialer is further adapted to automatically call back said remote telephone based on said point-to-point-to-point telephone call request.

10. Apparatus for establishing a point-to-point-to-point telephone connection through a caller's base telephone, comprising:

a first telephone line interface of said base telephone adapted to establish a telephone connection with a remote telephone having a different telephone number from that of said base unit;

a module in said base telephone adapted to receive a point-to-point-to-point telephone call request from said caller on said remote telephone, said module terminating said telephone connection with said remote telephone after receiving said point-to-point-to-point telephone call request;

an automatic dialer in said base telephone adapted to re-establish a connection with said remote telephone on said first telephone line interface;

a second telephone line interface of said base telephone adapted to establish a telephone connection with a desired called telephone on a second telephone line; and a communication path in said base telephone between said first telephone line interface and said second telephone line interface to establish said point-to-point-to-point telephone connection.

11. The apparatus for establishing said point-to-point-to-point telephone connection according to claim 10, further comprising:

a module in said base telephone adapted to receive an authorizing code from said remote telephone; and a processor in said base telephone adapted to compare said received personal identification number to a pre-stored personal identification number, said communication path being established only if a match is determined between said received personal identification number and said pre-stored personal identification number.

12. Apparatus for establishing a point-to-point-to-point telephone connection with a caller's two-line telephone base unit, comprising:

means in said base unit for establishing a first telephone connection with said remote telephone on a first telephone line of said base unit;

means in said base unit for receiving a point-to-point-to-point telephone call request over at least one of a paging system and an Internet;

means in said base unit for establishing a second telephone connection with a desired called telephone on a second telephone line of said base unit; and means in said base unit for establishing a communication path between said first telephone line and said second telephone line to establish said point-to-point-to-point telephone connection between said remote telephone and said called telephone with said two-line telephone unit as an intermediary.

* * * * *